United States Patent [19]
Altrock

[11] Patent Number: 6,164,489
[45] Date of Patent: Dec. 26, 2000

[54] CAROUSEL FEED

[75] Inventor: Nick L. Altrock, Howell, Mich.

[73] Assignee: Fabristeel Products, Inc., Taylor, Mich.

[21] Appl. No.: 09/275,622

[22] Filed: Mar. 24, 1999

Related U.S. Application Data

[60] Provisional application No. 60/079,332, Mar. 25, 1998.

[51] Int. Cl.⁷ .................................................. B65G 59/00
[52] U.S. Cl. .............................................. 221/1; 221/277
[58] Field of Search .................................... 221/1, 7, 9, 10, 221/13, 25, 92, 132, 123, 277, 258, 268

[56] References Cited

U.S. PATENT DOCUMENTS

| | | |
|---|---|---|
| 3,334,724 | 8/1967 | Steward ..................................... 198/41 |
| 3,430,808 | 3/1969 | Matthews ................................... 221/10 |
| 3,858,299 | 1/1975 | Woods ....................................... 29/211 |
| 4,532,664 | 8/1985 | Steward et al. ............................ 10/162 |
| 5,299,351 | 4/1994 | Takahashi et al. ......................... 29/798 |
| 5,339,983 | 8/1994 | Caple ........................................ 221/25 |

Primary Examiner—Kenneth W. Noland
Attorney, Agent, or Firm—Howard & Howard

[57] ABSTRACT

The present invention relates to a fastener supply system and, more particularly, to a fastener supply system which uses a plurality of feed stands mounted upon a turntable which are automatically positioned to ensure continuous fastener feed. The system detects the flow of fasteners at one or more power feeders and when the fasteners are getting low, rotates a new supply of fasteners to the power feeder and begins to supply fasteners before the installation head supply is interrupted. The operator merely ensures that the feed stands have reels of fasteners in place and the system automatically continues to feed those fasteners.

16 Claims, 7 Drawing Sheets

CAROUSEL FEED

This invention claims priority from U.S. Provisional patent application Ser. No. 60/079,332, filed on Mar. 25, 1998.

BACKGROUND OF THE INVENTION

The present invention generally relates to fastener feed systems. More particularly, the present invention relates to an indexing feed system having a carousel table which automatically indexes to continue the uninterrupted supply of fasteners to an installation head.

In many fastener installation systems, the fasteners are formed into long continuous strips that are rolled onto reels. When used, the reels are mounted upon a dereeler stand so that they can be fed into the installation head. The dereeler stand is basically a support stand having side members, a support rod extending between the side members, and a roller bracket. The support rod is inserted into the center hole of the reel and then positioned between the side members to support the reel between the side members. The strip of fasteners is guided under the roller bracket and into an installation head for the installation of the fasteners into a work piece. The installation head assembly generally pushes the fasteners into the installation head.

Typically, an alarm sounds to signal that a reel has been emptied and needs to be replaced. When the reel is empty, a worker removes the empty reel, inserts a new reel of fasteners, threads the free end of the fastener strip under the roller bracket and into the installation head so that the process can then be started again. As should be appreciated, the time needed to replace the reel can result in costly down time for the equipment.

SUMMARY OF THE INVENTION

The present invention provides an improved fastener delivery system that automatically reloads the installation head with a full reel when a reel has been emptied. The system in the disclosed embodiment automatically delivers four or more reels to the installation head before new reels must be manually loaded onto the feed system. The ability to automatically and continuously deliver fasteners to the installation head greatly reduces down time of the machinery and greatly reduces the possibility that an installation head will remain idle over a long period of time because of an operator not replacing the reel in a timely manner. As will be appreciated by those of ordinary skill in the art, although four reels are illustrated, two or more reels could be used, for example, two, six, eight, nine reels, etc., could be used if desired.

The supply system of the present invention is a timed circuit controlled carousel that automatically delivers and loads a reel of fasteners to the installation head when a reel has been emptied. The feed system of the present invention senses the number of fasteners remaining in the feed head after the reel supplying fasteners has emptied. When the number of fasteners is at a number that will allow the next reel of fasteners to be delivered and loaded without the installation head being emptied, a signal is given and the next reel is automatically presented to the installation head and fasteners are automatically loaded into the head.

The feed system of the present invention has a base with a carousel mounted on it. The carousel has a plurality of dereelers and roller blocks mounted upon it. Mounted adjacent the dereelers is a chute adapter assembly which rotates along with the dereelers on the carousel. The chute adapter assembly receives the free end of the fastener strip of a full reel, aligns the fastener strip and holds it in the proper load position to ensure that it will be properly loaded into the installation head.

The dereeler, roller block and chute adapter assembly rotate with respect to the installation head on the carousel. When the feed system signals an empty reel, the carousel rotates to supply the next full reel to the installation head before the installation head is empty.

A power feeder is mounted between the chute adapter and the installation head. When a reel of fasteners is rotated to the load position, the power feeder reaches out and grabs the end of the fastener strip and pulls it into the feed path of the installation head. The system is timed so that the free end of the fastener strip on the reel is closely adjacent the end fastener of the fastener strip in the installation head. In this way, a continuous uninterrupted flow of fasteners is fed into the installation head so that there is no interruption of the installation head's operation. As the reels are emptied, an operator can remove empty reels and replace them quickly with full reels of fasteners without interrupting the operation of the installation head.

Other advantages and meritorious features of the present invention will become more fully understood from the following description of the preferred embodiments, the appended claims and the drawings, a brief description of which follows.

DETAILED DESCRIPTION OF THE PREFERRED EMBODIMENT

Figure 1:
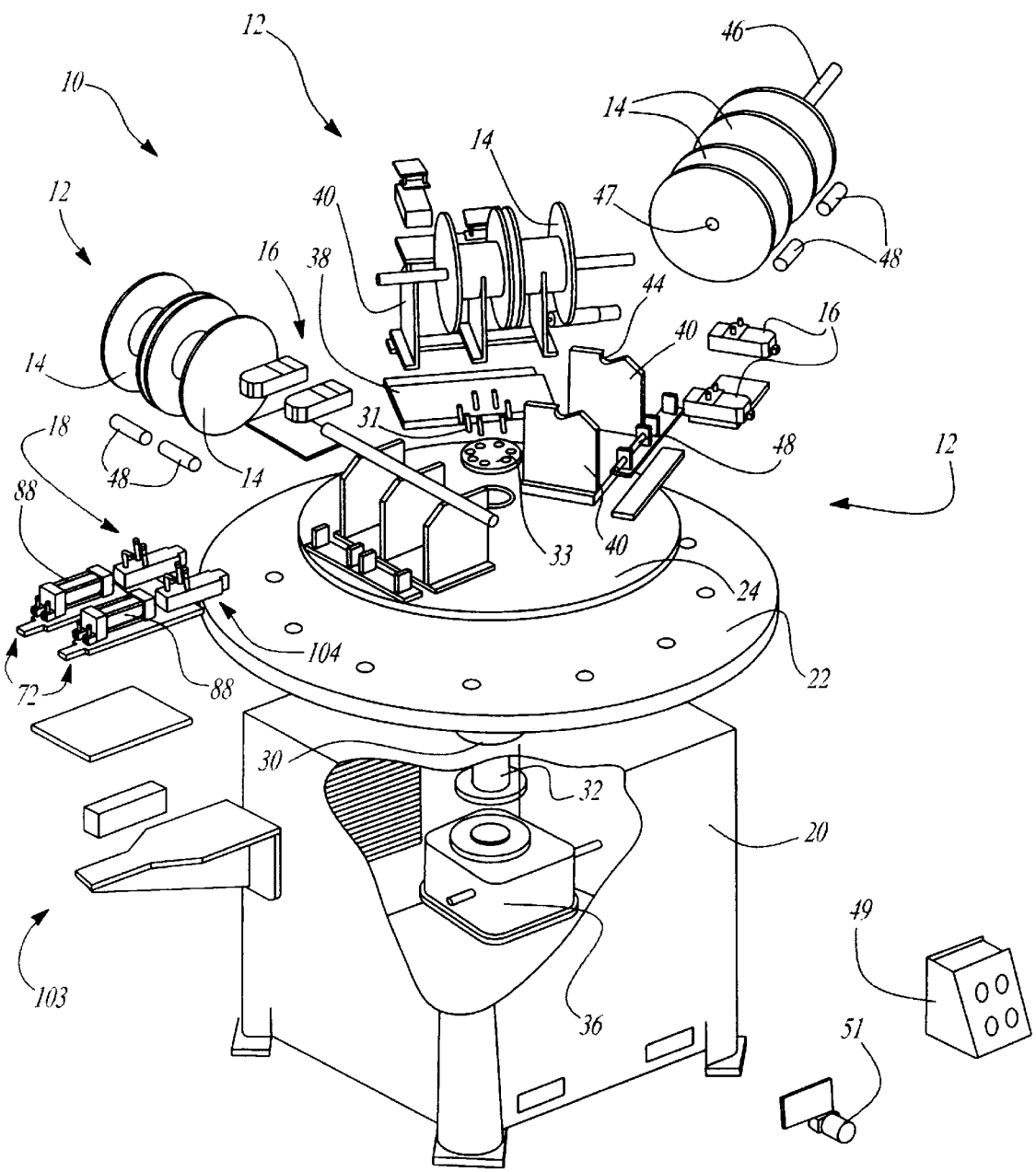
FIG. 1 is an exploded perspective view of the dual indexing feed system of the present invention.

The indexing feed system of the present invention is shown generally at 10 in the figures. With reference to FIG. 1, the indexing feed system 10 includes a plurality of dereeler stands 12 which are adapted to receive fastener reels 14 which contain coils of fasteners. The free end of the coiled fasteners are initially snapped into a chute adapter assembly 16 mounted adjacent to the fastener reels 14 so that when moved into position with respect to a power feeder 18, the power feeder 18 can pull the free end of the coiled fastener strip into an installation head (which is not illustrated).

The dereeling stands 12, fastener reels 14 and chute adapter assembly 16 are all mounted upon a turntable 22 which is rotatably mounted upon a base 20. In the disclosed embodiment, the stands 12, fastener reels 14 and chute adapter assemblies 16 are mounted upon a rotatable mounting plate 24 so that they can be rotated with respect to the turntable 22. In the preferred embodiment, Teflon bushings 26 are mounted to the turntable 22 and engage the bottom of the mounting plate 24 so that mounting plate 24 can be easily rotated with respect to the turntable 22. A pin, not shown, is used to fix the mounting plate 24 with respect to turntable 22 when the mounting plate 24 has been properly positioned with respect to the turntable 22.

Figure 4:
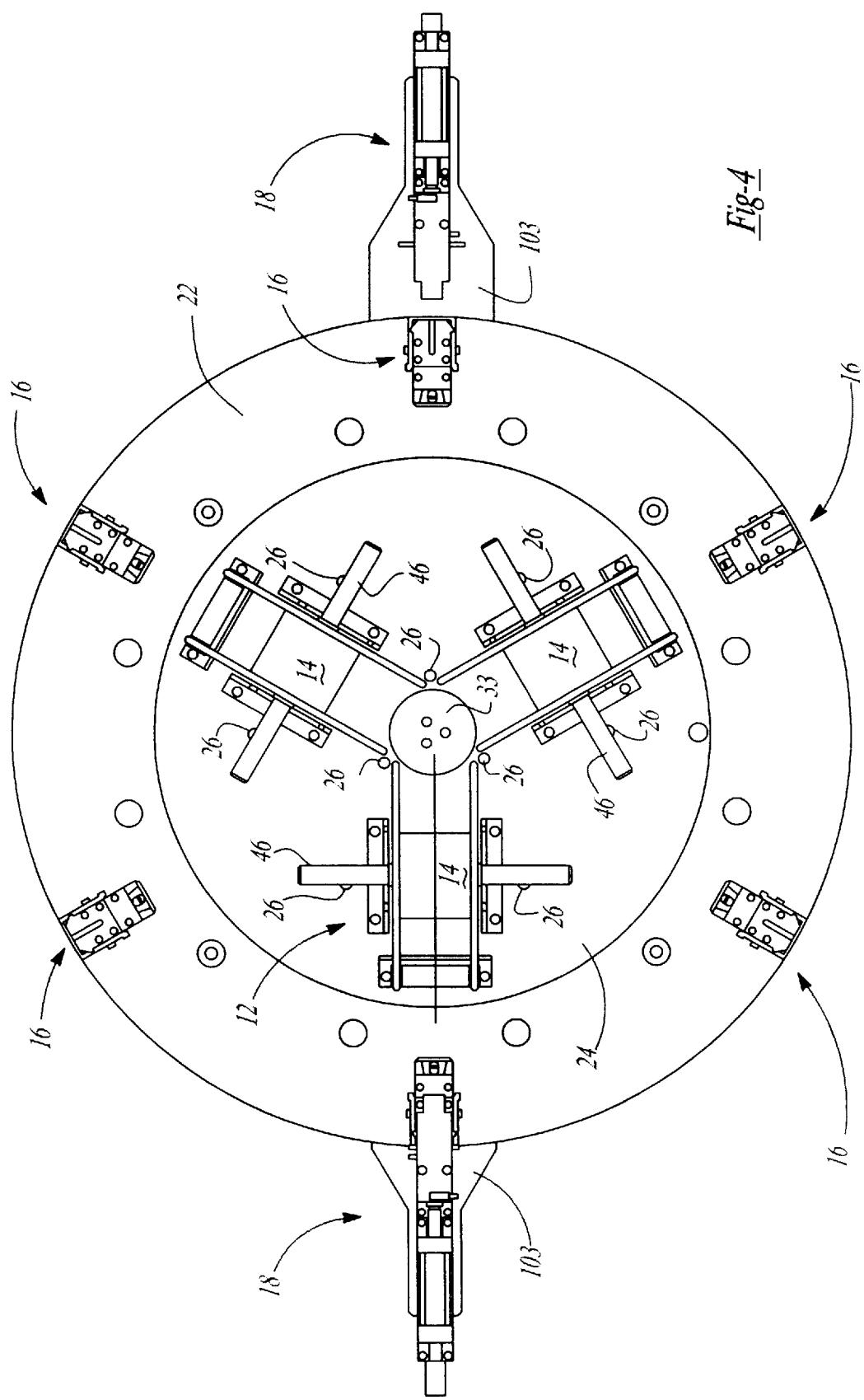
FIG. 4 is a top view of the indexing feed system of the present invention.
Figure 5:
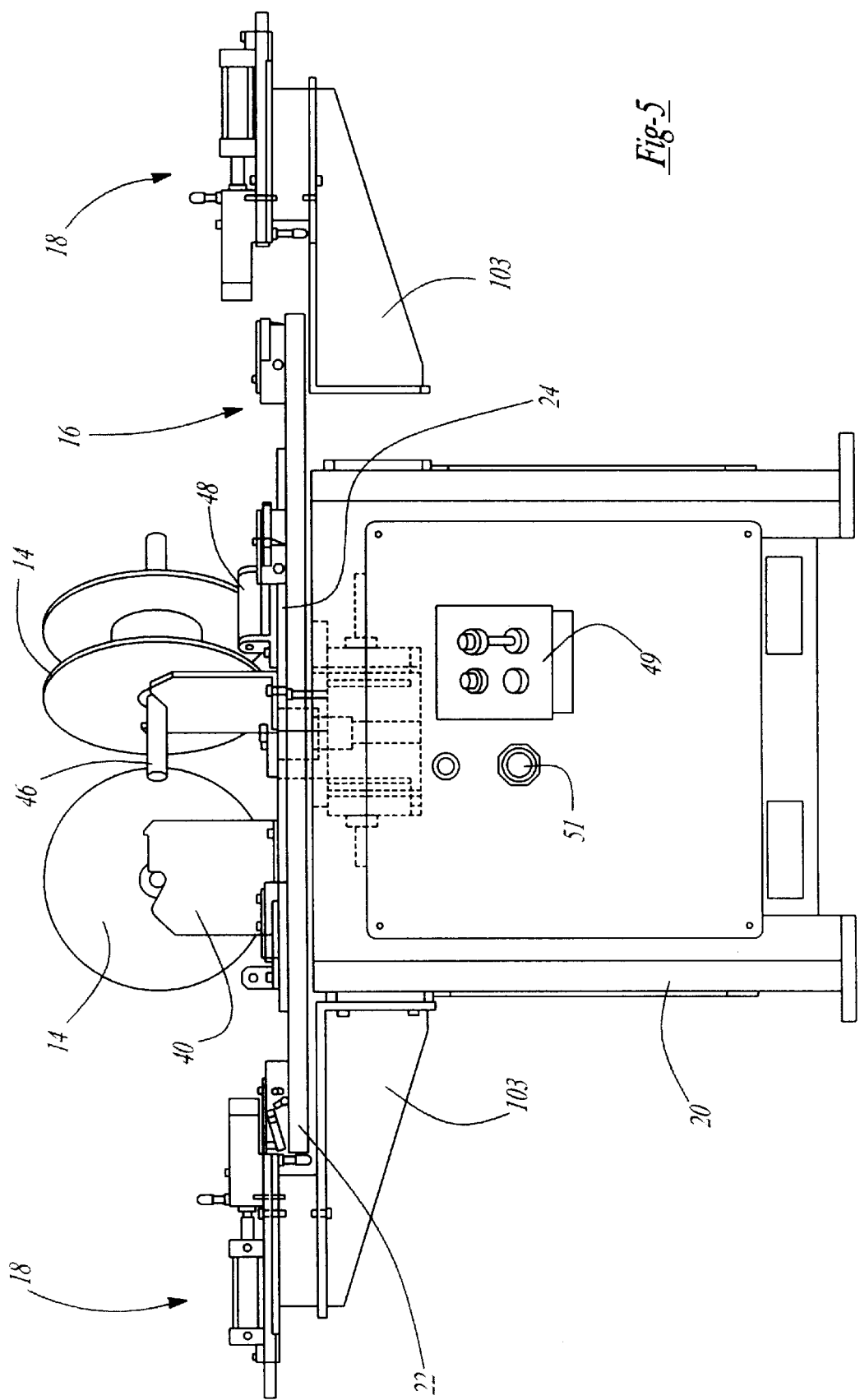
FIG. 5 is a side view of the indexing feed system of the present invention.
Figure 6:
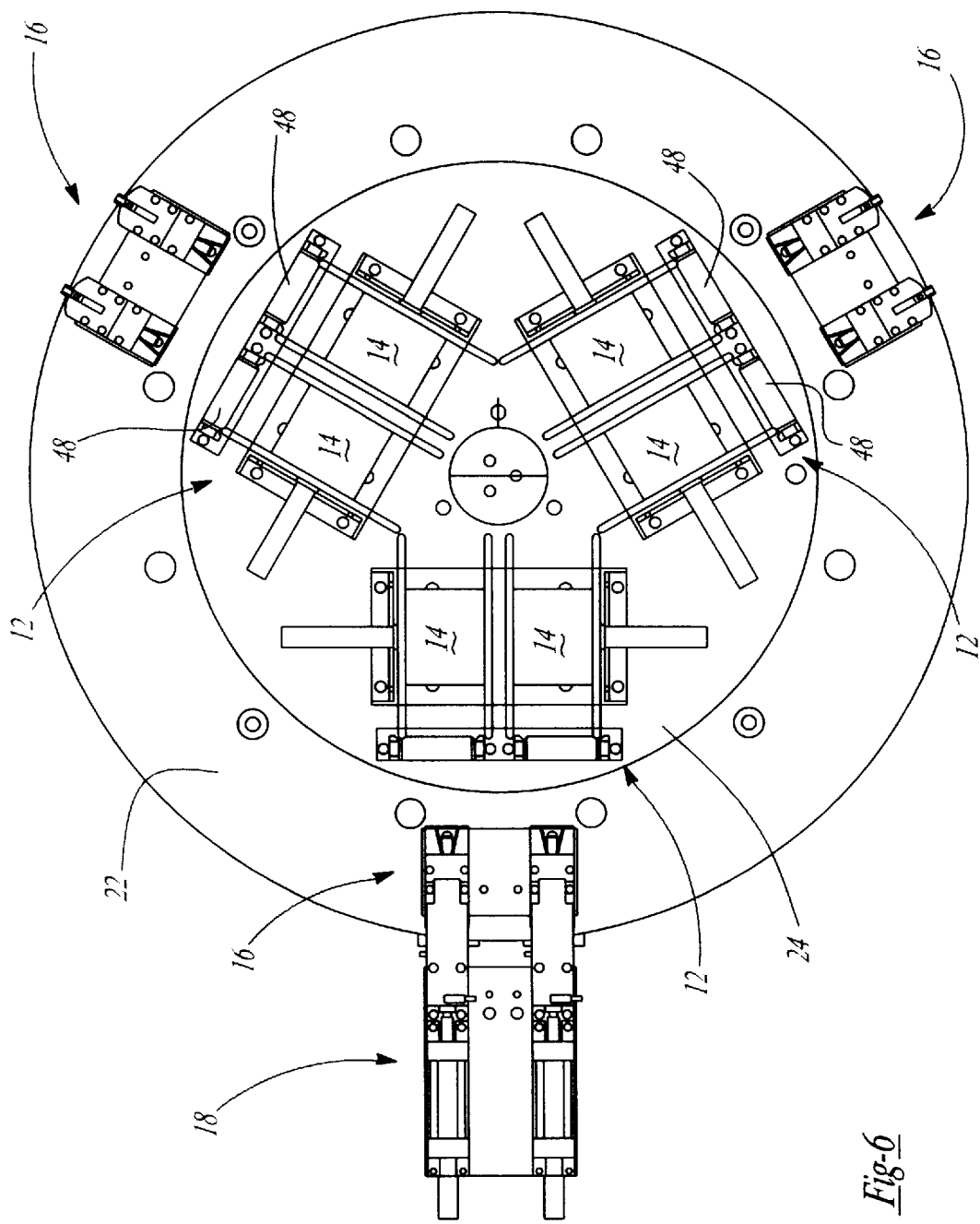
FIG. 6 is a top view of a dual indexing feed system of the present invention.
Figure 7:
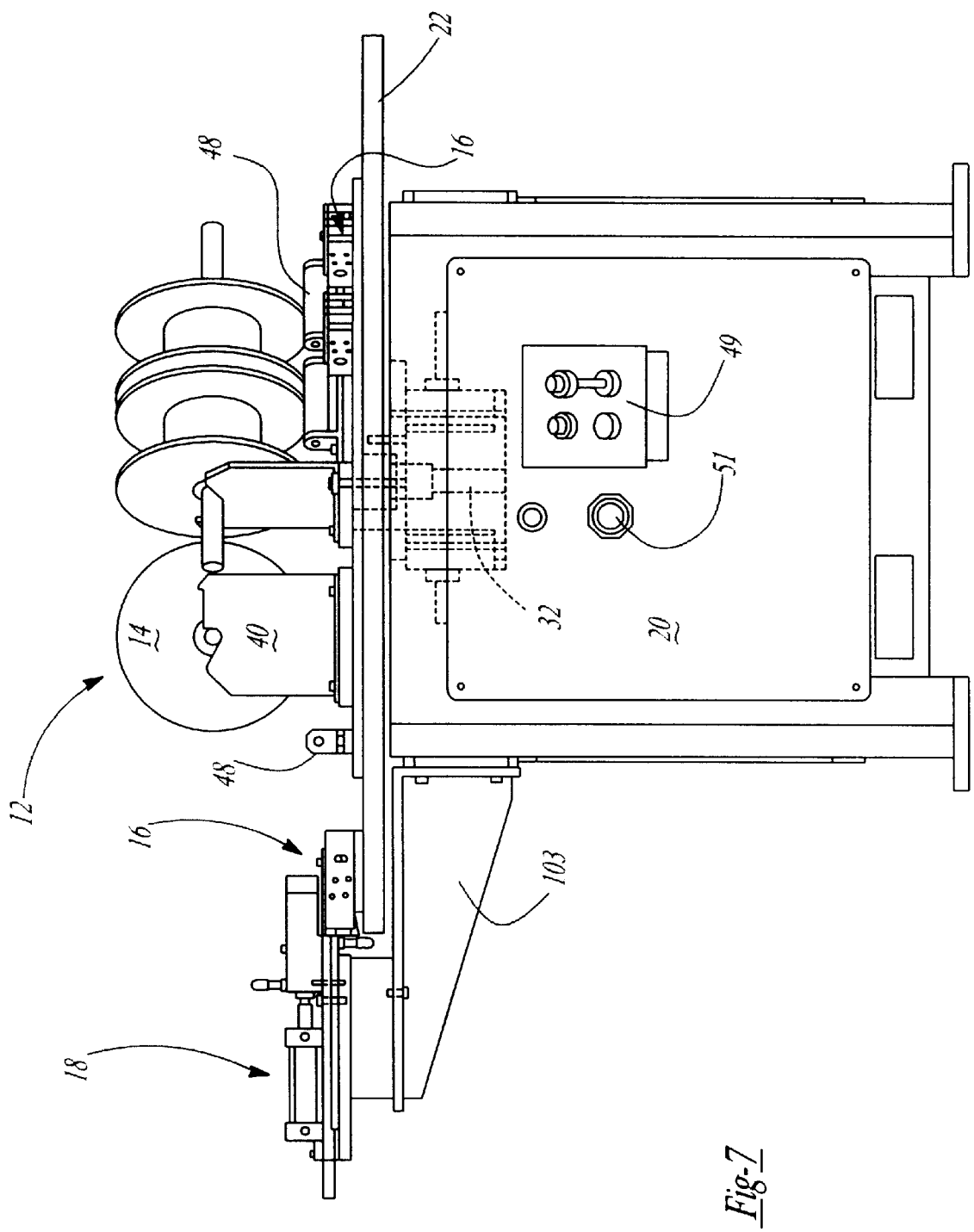
FIG. 7 is a side view of a dual indexing feed system of the present invention.

The purpose for having a mounting plate 24 rotatable with respect to turntable 22 is so that additional stands 12 and chute adapter assemblies 16 can be mounted upon plate 24 and rotated into position. In this way, different sized fasteners can be mounted upon the carousel 10 and used for different installation heads. For example, three additional mounting stands could be mounted upon the turntable so that the operator has the option of using two different size fasteners. By rotating the plate 24 with respect to turntable 22, the operator has the option of using two different sizes or types of fasteners with the single power feeder 18. Further, an additional power feeder could be mounted at an angle with respect to power feeder 18 so that the carousel 10 could be used to index and supply two different power feeders simultaneously. Further, as illustrated in FIG. 1 and FIG. 4, dual fastener reels, chute adapter assemblies and power feeders are provided to supply two installation heads with fasteners from the single carousel 10, as shown. Or, if additional power feeders and installation heads are used, four power feeders and installation heads could be supplied from a single carousel 10.

The base 20 has a central opening 30 through which a drive shaft 32 protrudes. The drive shaft 32 is covered at one end by a cover plate 33 adjacent to mounting plate 22 and is connected to a drive motor 36 at the opposite end. In the preferred embodiment, the turntable 22 is mounted to the drive shaft 32 and the mounting plate 22 is merely positioned by the end of drive shaft 32 adjacent cover plate 33. The mounting plate 24 has an opening with a diameter slightly larger than the diameter of the drive shaft so that the drive shaft merely positions the mounting plate 24, but does not interfere with the mounting plate's ability to rotate with respect to the turntable 22. When the pin is inserted, plate 24 rotates with table 22. Fasteners 31 are used to fasten cover plate 33 to the top of drive shaft 32.

The mounting stand 12 of the present invention, as illustrated in FIG. 1, has a base plate 38 and three upright side supports 40. The base plate is attached to the mounting plate 22 by bolts which extend through the base plate 38 and into openings 42. The side supports 40 have notches 44 which are adapted to receive a rod 46 upon which the fastener reels 14 are free to rotate. As shown in FIG. 1, the fastener reels 14 have a central opening 47 which is adapted to receive rod 46. Guide rollers 48 are mounted adjacent the base plate 38 for guiding the fastener strip as it is reeled from reel 14. In the preferred embodiment, the fastener strip is removed from the bottom of the reel 14 and passes under the guide roller 48.

The control panel is shown at 49, and an air hose or hydraulic fluid hose is connected to outlet 51 to power motor 36.

Figure 2:
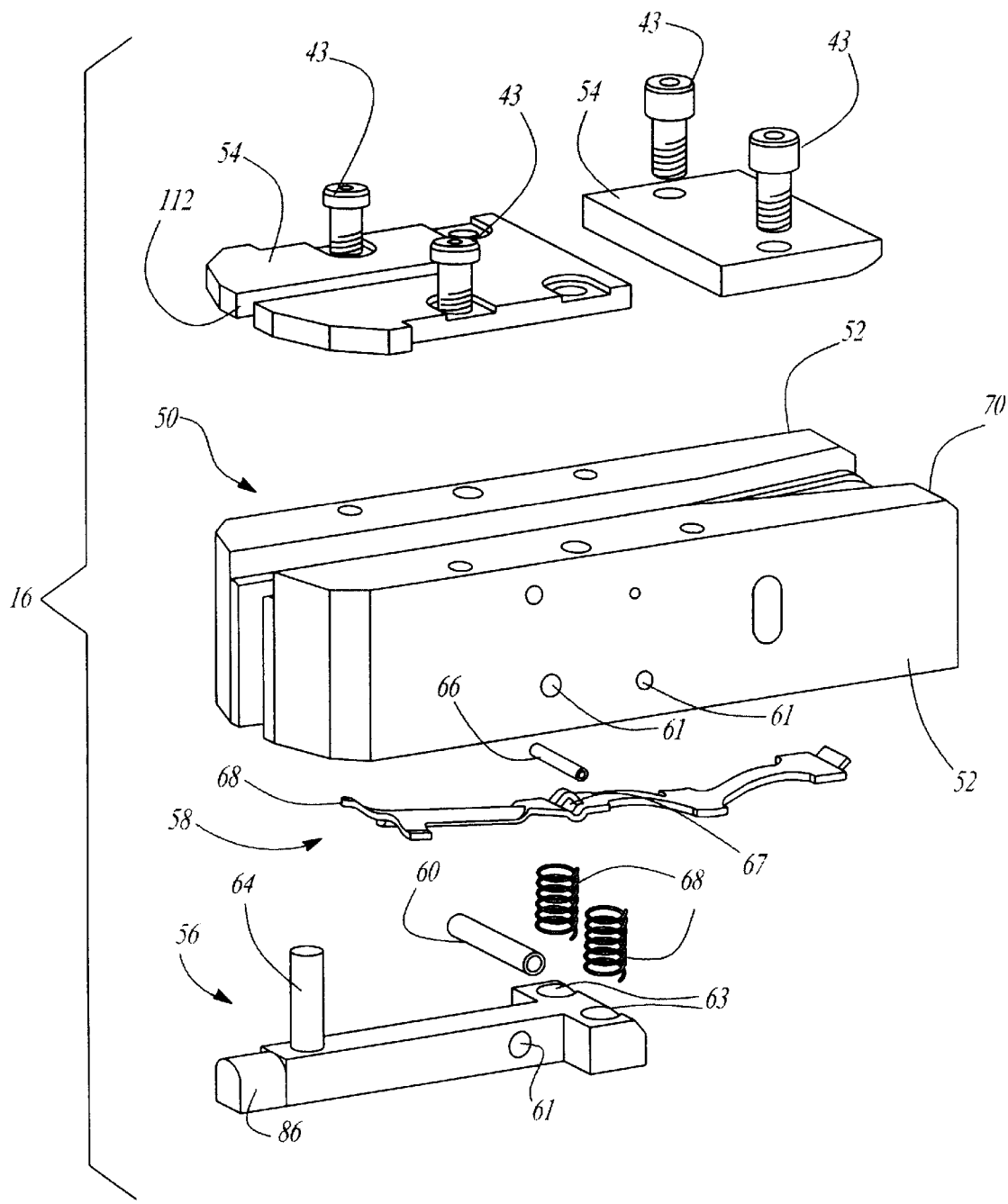
FIG. 2 is an exploded perspective view of the chute adapter assembly of the present invention.

With reference to FIG. 2, the chute adapter assembly 16 will be described. Chute adapter assembly 16 has a housing 50 which is mounted to the mounting plate 22 by fasteners. The housing in the disclosed embodiment is defined by two side walls 52 which form a guide track for the fastener strip. The side walls 52 are illustrated as metal blocks. Cover plates 54 are provided to cover the side walls 52. Bolts 43 are shown to attach plates 54 to side walls 52.

A stop member 56 and restrictor 58 are pivotally mounted within the side walls 52. Stop member 56 is illustrated as a generally T-shaped member which is mounted by a pivot pin between the side walls 52. The pivot pin 60 is received in openings 61 in the stop member 56 and walls 52. Springs 68 are received within pockets 63 to bias the stop 56 into the fastener track of chute adapter assembly 16. A stop member 64 protrudes from the end of the stop 56. The stop member 64 is adapted to be engaged by the free end of the fastener strip to ensure that the fastener strip is properly positioned within the chute adapter assembly 16. As will be described below, the power feeder 18 engages the camming surface 86 of the stop 56 to pivot the stop 56 downwardly and allow the fastener strip to pass through the chute adapter assembly 16, and power feeder 18 into the installation head.

The restrictor 58 is pivotally mounted between the side walls 52 by a pin 66 which is received in openings 67. The end 68 of restrictor 58 is adapted to engage within the thread bore of the first fastener of the fastener strip as the fastener strip is inserted into the chute adapter assembly 16. In use, the fastener strip is inserted into the chute adapter assembly at end 70 until it engages stop member 64 and end 68 of restrictor 58 clicks into the thread bore. Once end 68 clicks into the thread bore, the fastener strip is held in the chute adapter assembly 16 and is ready to be delivered to the power feeder 18. As will be appreciated by those of ordinary skill in the art, the loading of the chute adapter assembly 16 is quick and foolproof.

Figure 3:
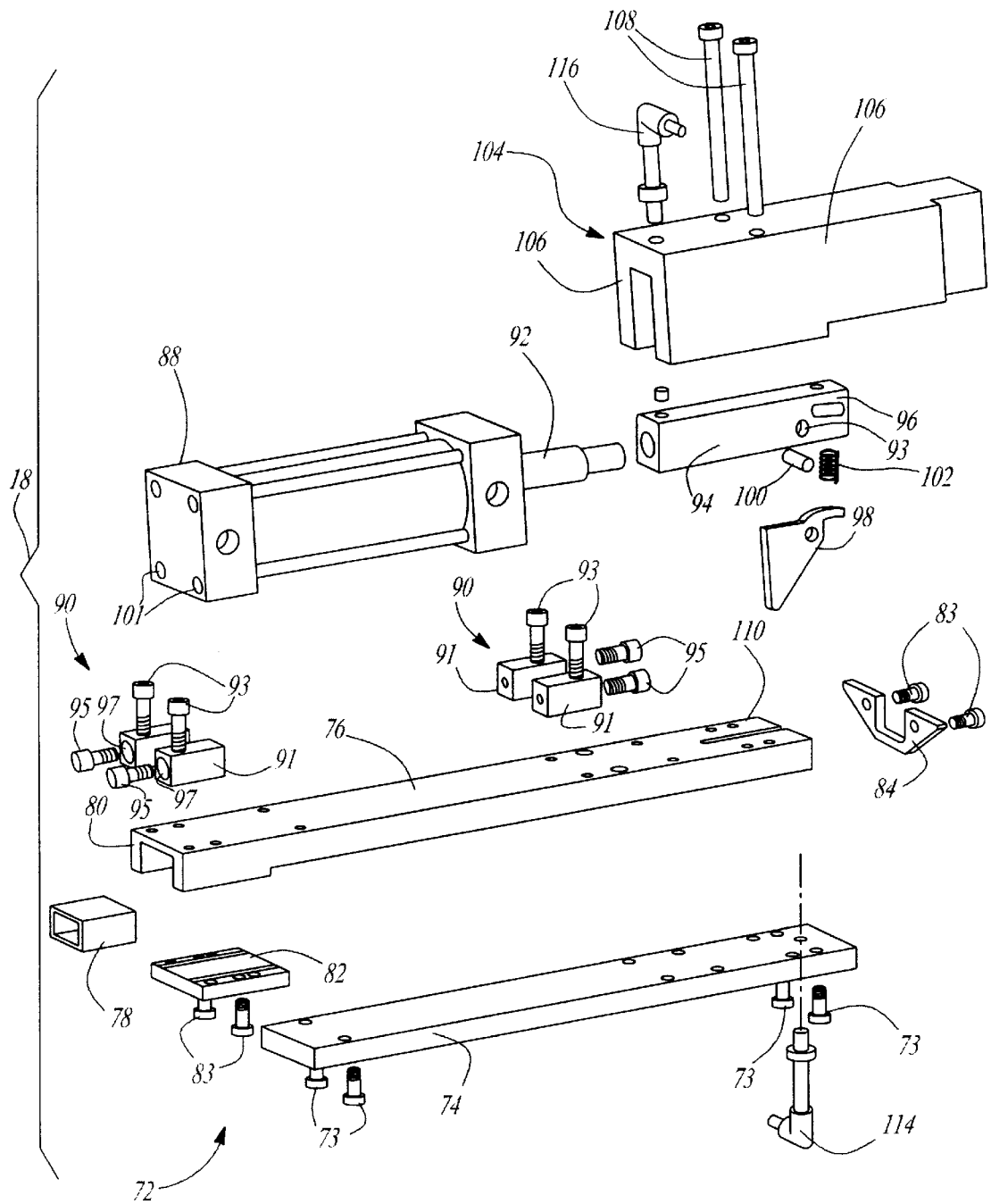
FIG. 3 is an exploded perspective view of the power feeder of the present invention.

With reference to FIG. 3, the power feeder 18 of the present invention will be described. Power feeder 18 includes a guide chute 72 defined by a base member 74 and a top track 76. The chute 72 is mounted to base 74 by bolts 73. A fastener chute 78 is mounted to the end 80 of the guide chute 72 by a mounting cap 82 which is attached by bolts 83. The chute 78 delivers fasteners from the power feeder 18 to the installation head. As will be appreciated by those of ordinary skill in the art, chute 78 can be several feet long. A cam member 84 is mounted by bolts 83 to the opposite end of guide chute 72, and in particular, to top track 76. This cam member is adapted to engage the camming surface 86 of stop 56 to pivot stop member 64 out of the fastener track of chute adapter assembly 16 as turntable 22 rotates a reel of fasteners into the load position.

A cylinder 88 is mounted to the top rack 76 through fasteners 90. In the disclosed embodiment, the fasteners 90 have blocks 91 that are fastened to top track 76 by bolts 93. Bolts 95 are inserted into openings 97 and threaded into cylinder 88 in openings 101 which are internally threaded. The cylinder 88 has a cylinder rod 92 with a coupler 94 mounted to it. The coupler 94 has a free end 96 to which a pawl 98 is pivotally attached. Pawl 98 is pivotally attached through a pivot pin 100 which extends through opening 93 in the coupler 94. A spring 102 biases pawl 98 into the downward position. A coupler guide 104 is mounted over coupler 94 to guide the coupler as it extends and retracts with respect to cylinder 88. The coupler guide is illustrated as a U-shaped housing having downwardly extending walls 106 that act as the guides for guiding coupler 94. Bolts 108 are used to mount the coupler guide 104 to the top track 76. In the disclosed embodiment, the power feeder 18 is mounted upon a mounting stand 103 connected to base 20.

In use, the turntable 22 rotates a fastener reel to the load position directly across from the power feeder 18. As the fastener reel 14 is rotated, camming member 84 engages camming surface 86 to pivot stop member 64 out of the fastener track, allowing the fasteners to freely move through the fastener track. Once stop member 64 is pivoted, cylinder 88 extends coupler 94 into the chute adapter assembly 16. As disclosed, top track 76 has a slot 110 and cover plate 54 has a slot 112 to allow pawl 98 to move freely with respect to top track 76 and cover plates 54. The pawl 98 engages the bore of the first fastener of the fastener strip and clicks in place. Once clicked in place, pawl 98 pushes restrictor 58 out of the cylinder bore, thus transferring control of the fastener from restrictor 58 to pawl 98. With pawl 98 having control of the fastener strip, cylinder 88 retracts coupler 94 pulling the first fastener and connected strip into the guide chute 72 to deliver the fasteners to the installation head. In the disclosed embodiment, cylinder 92 extends and retracts coupler 94 repeatedly to engage the thread bore of the fasteners and repeatedly pull them into guide chute 72 and deliver them to the installation head. It will be appreciated by those of ordinary skill in the art that the newly delivered strip fasteners will be pulled by the pawl on the coupler and begin to push the remaining fasteners from the previous reel into the installation head. In this way, there is no interruption in installation head operation.

As shown in FIG. 3, there are two proximity switches 114 and 116. Proximity switch 114 indicates the existence of a fastener in guide chute 72 and completes the circuit continuing to energize cylinder 97 so that it continues to pull fasteners through the guide chute 72. Once proximity switch 114 detects no fasteners, cylinder 72 is signaled to retract and simultaneously the turntable 22 is signaled to rotate. Proximity switch 116 ensures that the coupler 94 has been fully retracted before turntable 22 begins to rotate in order to prevent the chute adapter assembly 16 from colliding with the coupler 94. Once turntable 22 rotates, chute adapter assembly 16 is in the load position across from power feeder 18. The stop 56 is cammed downwardly to free the fastener path. The circuit then energizes cylinder 88 which extends coupler 94 and pawl 98 into the chute adapter assembly 16 such that pawl 98 can engage the thread cylinder of the fastener and pull it into guide chute 72. Once that fastener has been pulled into guide chute 72, the proximity switch 114 signals that a fastener is present and the cylinder 88 begins to extend and retract until the proximity switch 114 signals that no fasteners are left and the cycle begins again. A standard control circuit is used to control the operation. The control circuit is interconnected to the control panel 49 for operator controlled input.

In this way, the indexing feed system of the present invention can provide fasteners continuously without interruption to the installation head.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

I claim:

1. A fastener feed assembly comprising:
   a carousel having a turntable upon which at least two fastener dereeler stands are mounted;
   at least two chute adapter assemblies with each mounted adjacent to one of said fastener dereeler stands; each of said chute adapter assemblies having a fastener holding mechanism for holding the end of a strip of fasteners in proper feeding position;
   a power feeder mounted adjacent the turntable; the power feeder having a retractable pawl to extend into the chute adapter and engage a fastener and pull fasteners from the chute adapter and deliver the fasteners to the installation head;
   a control circuit synchronizing the rotation of the turntable and operative interaction of the chute adapter assembly and the power feeder.

2. The fastener feed assembly of claim 1, wherein said carousel further includes a mounting plate rotatably mounted to said turntable, said fastener dereeler stands are mounted to said mounting plate and selectively rotatable with respect to said turntable, said chute adapter assemblies are mounted to said turntable, wherein said fastener dereeler stands can be positioned into operative alignment with respect to said chute adapter assemblies.

3. The fastener feed assembly of claim 2, further including a plurality of fastener reels with fasteners of different sizes on at least some of said reels, said mounting plate being rotatable to position desired fastener sizes into operative position with respect to said chute adapter assemblies.

4. The fastener feed assembly of claim 1, further including a fixing member to fix the mounting plate with respect to said turntable.

5. The fastener feed assembly of claim 1, further including a base member upon which said turntable is rotatably mounted, said base member including a drive shaft upon which said turntable is fixedly mounted to rotate with said drive shaft.

6. The fastener feed assembly of claim 5, wherein said mounting plate has a central opening into which said drive shaft extends to position said mounting plate with respect to said turntable and allow independent rotation of said mounting plate with respect to said drive shaft and said turntable.

7. The fastener feed assembly of claim 1, wherein said chute adapter assembly includes a housing into which a strip of fasteners can be inserted, a stop member for proper positioning of a strip of fasteners and a restrictor for engaging into the thread bore of one of said fasteners of a strip of fasteners.

8. The fastener feed assembly of claim 7, wherein said stop member includes a body portion with a projection, said body portion being pivotally mounted to said housing to pivot with respect to said housing.

9. The fastener feed assembly of claim 7, wherein said restrictor is pivotally mounted in said housing and has an end adapted to engage within the thread bore of at least one of the fasteners of the strip of fasteners.

10. The fastener feed assembly of claim 1, wherein said power feeder includes a guide chute for guiding a strip of fasteners, and a pawl for forcing a strip of fasteners into said guide chute.

11. The fastener feed assembly of claim 10, wherein said power feeder includes a cam member for engaging said chute adapter assembly to release the strip of fasteners.

12. The fastener feed assembly of claim 1, wherein said chute adapter assembly includes a housing into which a strip of fasteners can be inserted, a stop member for proper positioning of a strip of fasteners and a restrictor for engaging into the thread bore of one of said fasteners of a strip of fasteners; said power feeder includes a guide chute for guiding a strip of fasteners, and a pawl for forcing a strip of fasteners into said guide chute and a cam member for engaging said chute adapter assembly to pivot said stop member out of the path of a strip of fasteners, said pawl being adapted to engage the thread bore of a fastener and transfer control of the fastener strip from the restrictor to the pawl.

13. The fastener feed assembly of claim 1, further including at least one proximity switch for determining the presence of a fastener in said power feeder and the location of said pawl with respect to said chute adapter assemblies.

14. A method for supplying strip fasteners to a fastener installation head, said method comprising the steps of:

provided a carousel having a turntable upon which at least two fastener dereeler stands are mounted, at least two chute adapter assemblies with each mounted adjacent to one of said fastener dereeler stands; each of said chute adapter assemblies having a fastener holding mechanism for holding the end of a strip of fasteners in proper feeding position;

a. a power feeder mounted adjacent the turntable the power feeder having a reciprocal pawl to extend into the chute adapter and engage a fastener;

b. inserting the end of a fastener strip into said adjacent chute adapter assembly;

c. rotating said turntable to a position wherein said chute adapter assembly having a fastener strip inserted is adjacent said power feeder;

d. extending said reciprocal pawl into said chute adapter assembly and transferring control of the fastener strip from said chute adapter assembly to said pawl;

e. retracting said pawl and pulling the fastener strip from the chute adapter assembly and delivering the fasteners to the installation head.

15. The method of claim 14, further including the steps of:

rotating one of said fastener dereeler stands to a position adjacent a chute adapter assembly;

locking said fastener dereeler stand with respect to said chute adapter assembly.

16. The method of claim 14 further comprising the steps of:

providing one or more sensors;

sensing the position of said pawl with respect to said chute adapter assembly and sensing the presence of a fastener in said chute adapter assembly;

retracting said pawl and rotating said turntable when said sensor senses the absence of a fastener in said chute adapter assembly;

energizing said power feeder to extend and retract said reciprocal pawl when said sensor senses the presence of a fastener in said power feeder.

* * * * *